No. 667,241. Patented Feb. 5, 1901.
P. J. MORAN.
WAGON NUT LOCK.
(Application filed May 5, 1900.)
(No Model.)
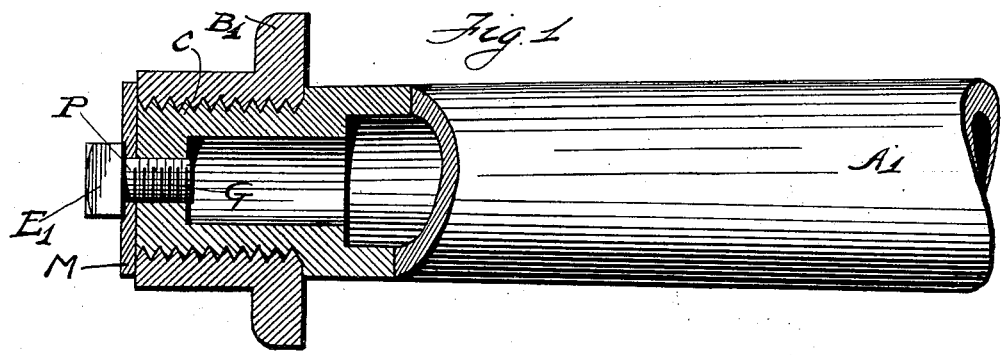
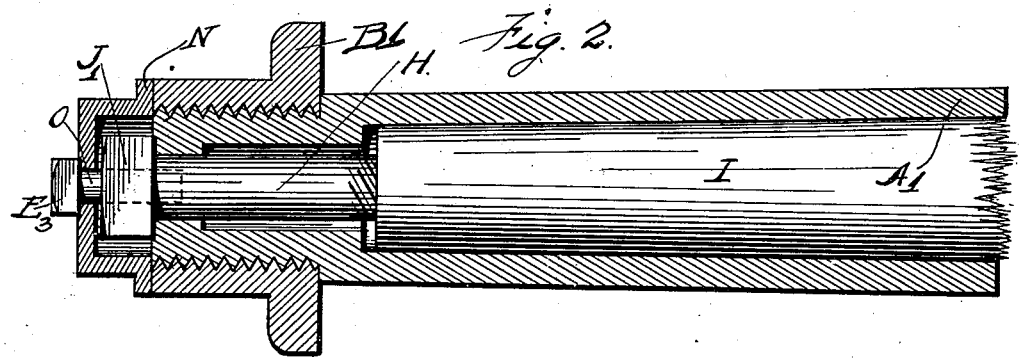
Witnesses
C. W. Heiskell
T. F. Kelley
Inventor
Patrick J. Moran
by J. Heiskell Weatherford
his atty.

UNITED STATES PATENT OFFICE.

PATRICK J. MORAN, OF MEMPHIS, TENNESSEE.

WAGON NUT-LOCK.

SPECIFICATION forming part of Letters Patent No. 667,241, dated February 5, 1901.

Application filed May 5, 1900. Serial No. 15,637. (No model.)

*To all whom it may concern:*

Be it known that I, PATRICK J. MORAN, a citizen of the United States, residing at Memphis, Shelby county, State of Tennessee, have invented certain new and useful Improvements in Wagon Nut-Locks, of which the following is a specification.

My invention relates to an improvement in nut-locks for locking nuts on wagon-axles.

The object of my invention is to provide a simple and effective nut-lock which is durable and which may be applied to vehicles which are now in use by any carriage-smith or blacksmith and that without excessive cost.

My invention consists in combining with the axle-nut a lock binding on the outer face of the nut, said lock having threads cut in the opposite direction from those on the axle-nut, and in the details and parts hereinafter set forth more fully in the drawings, specification, and claims.

In the drawings, Figure 1 is a sectional elevation of a thimble-skein wagon-axle, showing an open nut, washer, and cap-screw lock. Fig. 2 is a sectional elevation of a thimble-skein axle, showing the thimble held in place on the wooden axle J by means of a lag-screw.

Referring now to the drawings, in which like parts are indicated by the same letters of reference, Fig. 1 shows a thimble-skein axle A', on which is screwed an ordinary open-end wagon-nut B'. The thread C on this nut B' and that on the axle-skein A' are right or left as the axle is used for the right or left wheel, (facing forward in the vehicle,) respectively. In the end of the axle-skein B', I tap a hole having left or right hand threads, respectively, according as the axle-skein has right or left hand threads, and into this hole I screw a cap G, having threads cut to fit. Since the nut is open and the cap-screw hardly large enough to touch the nut, I use a washer M to hold the nut in place. This washer may be made integral with the cap-screw, in which case it forms an annular collar around the head of the screw, or in case the head of the cap-screw is large enough to engage the nut B' may be dispensed with altogether. In the drawings, however, I have shown the washer separate from the cap-screw, because the two may be thus more cheaply obtained than where they have to be specially made. It is best, and where possible should be so arranged, that the washer shall bind on the cap-screw at P, so that these two become, in effect, one piece and may be removed as one piece. In applying this form to an axle already in use it is only necessary to drill a hole in the end of the axle and tap same either with the nut and wheel on or off. If the nut be removed, it must of course be replaced and the cap-screw and washer be screwed up to complete the lock.

In Fig. 2 I show a lag-screw H to hold a thimble-skein in place. This lag-screw H projects beyond the end of the nut and prevents the washer from coming down on the nut. In this case I make use of a washer N, hollowed out to go over the head J' of the lag-screw. This washer has a hole O, through which a cap-screw $E^3$ is inserted, as in the preceding case, this lag-screw having left or right hand threads, as the case may be. In making this washer I preferably make it a cylindrical cup or hollow washer of diameter slightly larger than the greatest diameter of the head J' of the lag-screw H and of slightly-greater depth than the thickness of the head. This leaves the washer free to bind against the nut. As in Fig. 1, the cap-screw binds in the washer at O and forms with it one piece when they are removed. J is the end of the wooden axle, to which the thimble is held by the lag-screw H. In applying this form of lock it is only necessary to tap a thread in the head J' of the lag-screw H, either while the wheel is on or off or, if so desired, by removing the lag-screw entirely and taking it to a drill-press, where the work can be conveniently done and there drilling and tapping the hole and fitting the cap-screw, the washer and cap-screw being applied after the lag-screw has been replaced in the end of the axle.

The necessity for some such lock is obvious to any one who has noted the delays incident to the loss of an axle-nut on a crowded street, or the trouble—more serious, perhaps, to the individual—which the loss of a nut at a point some miles from the nearest shop may cause. The lock which I have described is the simplest and easiest applied lock which can be devised. At a comparatively trifling cost and without removing the load from his wagon the driver can have this lock fitted to his axle-nuts and be secure from the dangers and delays before mentioned. It is evident that should the nut start to loosen it will unscrew only to that point at which the lock binds on the face of the nut, and that any further attempt at turning will only serve to join the lock and nut together. It is obvious that if the lock is tightly set up there can be no movement at all and that it is only with careless handling that such movement can occur. It is further evident that no matter how carelessly the nut and lock are put on the final result will be the same—the lock will bind the nut and prevent its accidental removal, which is after all the desideratum.

Having thus fully described my invention, what I claim, and desire to secure by Letters Patent of the United States, is—

1. The combination with a thimble-skein axle, an open-face nut thereon and a washer binding on the outer face of the nut of an oppositely-threaded cap-screw passing through said washer and holding it against the said nut, substantially as and for the purposes set forth.

2. The combination with a thimble-skein axle and an open nut thereon of a hollow or cup-shaped washer binding on the outer face of the nut and an oppositely-threaded cap-screw passing through said washer and holding it against said nut, substantially as and for the purposes set forth.

3. As an axle-nut lock the combination with a thimble-skein, a lag-screw to hold same in place and an open nut on said skein, of a washer cupped or hollowed out to fit over the head of the said lag-screw and to bind against the outer face of said nut and a cap-screw tapped into the head of said lag-screw to hold the washer against the nut substantially as shown and described.

In testimony whereof I have signed my name to this specification in the presence of two subscribing witnesses.

PATRICK J. MORAN.

Witnesses:
F. H. HEISKELL,
THOS. B. TURLEY.